United States Patent
Jahkonen

(12) 
(10) Patent No.: US 6,452,357 B1
(45) Date of Patent: Sep. 17, 2002

(54) METHOD FOR CONTROLLING A PERMANENT MAGNET SYNCHRONOUS MOTOR

(75) Inventor: Pekka Jahkonen, Hyvinkää(FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 09/586,592

(22) Filed: Jun. 2, 2000

Related U.S. Application Data

(63) Continuation of application No. PCT/FI98/00941, filed on Dec. 2, 1998.

(30) Foreign Application Priority Data

Dec. 3, 1997 (FI) .................................................. 974412

(51) Int. Cl.$^7$ ............................................... H02P 6/08
(52) U.S. Cl. ........................ 318/721; 318/432; 318/500
(58) Field of Search ................... 318/138, 254, 318/268, 430–433, 439, 459, 463, 500, 602, 605, 700, 701, 720–724; 388/909

(56) References Cited

U.S. PATENT DOCUMENTS

| | | | | |
|---|---|---|---|---|
| 4,511,835 A | * | 4/1985 | Studtmann | 318/700 |
| 4,703,246 A | * | 10/1987 | Sakamoto et al. | 318/809 |
| 5,059,878 A | * | 10/1991 | Bardelang et al. | 318/490 |
| 5,296,794 A | * | 3/1994 | Lang et al. | 318/715 |
| 5,436,544 A | * | 7/1995 | Matsubara et al. | 318/719 |
| 5,569,995 A | | 10/1996 | Kusaka et al. | |
| 5,644,206 A | | 7/1997 | Yura | |
| 5,793,178 A | | 8/1998 | Biais | |
| 5,877,606 A | * | 3/1999 | Nozari | 318/700 |
| 5,998,957 A | * | 12/1999 | Tadmor et al. | 318/701 |

FOREIGN PATENT DOCUMENTS

| | | |
|---|---|---|
| EP | 0644648 A1 | 11/1994 |
| EP | 0790701 A2 | 12/1997 |
| EP | 0608571 A2 | 12/2000 |
| EP | 0783201 A1 | 12/2000 |

OTHER PUBLICATIONS

Stephen J. Chapman. "Electric Machinery Fundamentals", 3$^{rd}$ edition, Chap. 6 "synchronous motors", pp. 324–328 "motor Equivalent Circuits". McGraw–Hill, 1999.*

* cited by examiner

*Primary Examiner*—Bentsu Ro

(57) ABSTRACT

Method for controlling a permanent magnet synchronous motor, wherein an equivalent circuit describing the characteristics of the permanent magnet synchronous motor is formed, and via calculations based on. the equivalent circuit, a vectorial representation of the control quantities is produced, in which the horizontal axis of the co-ordinate system used represents the magnetisation, the vertical axis represents the torque and the vectors used are stator voltage (Us), supply voltage (e) and current (I), which is at a distance of 90° from the horizontal axis. In the vectorial representation, a correction vector (dU) is formed via inference based on the equivalent circuit and the correction vector is summed with the electromotive force, giving the stator voltage (Us) as a result.

24 Claims, 3 Drawing Sheets

METHOD FOR CONTROLLING A PERMANENT MAGNET SYNCHRONOUS MOTOR

Figure 1:
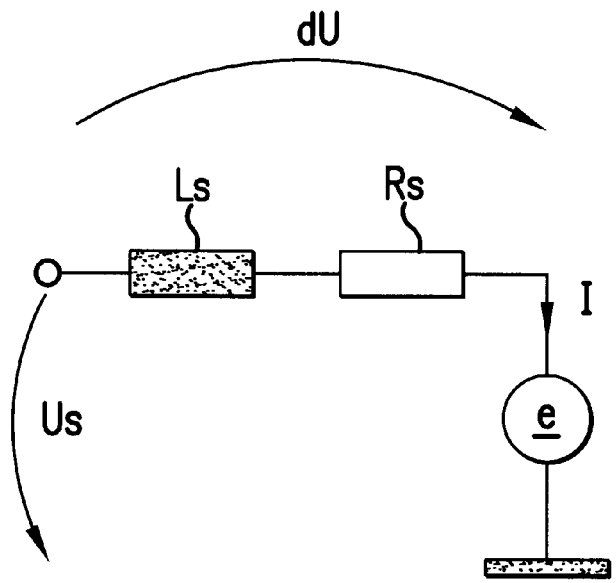

This application is a Continuation of PCT International Application No. PCT/FI98/00941 filed on Dec. 2, 1998, which designated the United States and on which priority is claimed under 35 U.S.C. §120, the entire contents of which are hereby incorporated by reference.

The present invention relates to a method as defined in the preamble. of claim 1 for controlling a permanent magnet synchronous motor and to a control loop as defined in the preamble of claim 6.

A conventional method in the control of an alternating-current motor is to convert from stator co-ordinates to rotor co-ordinates. and back to stator co-ordinates. This conversion serves to simplify the analysis of the alternating-current motor; in the rotor co-ordinates, the control quantities are interpreted at the direct. current level. In a practical implementation, effecting the conversions requires extra resources either in software or in electronics. The motor torque is generated as a vector product of magnetic flux and current, which means that the current and voltage have to be either as precisely as possible in phase or exactly in opposite .phase. Because of non-ideal properties, such as motor inductance or stator resistance, the system oscillates about the point of balance, with the result that passengers travelling in the elevator experience an unpleasant sensation. Typically, the oscillation frequency is low, about 2 . . . 5 Hz.

The object of the present invention is to eliminate the problems described above. A specific object of the present invention is to. disclose a new type of method for the control of a synchronous motor. The method simplifies the motor control, allowing a more advantageous implementation to be achieved than before. Another object is to achieve a control system that is particularly well suited for a permanent magnet synchronous motor used to drive an elevator.

As for the features characteristic of the present invention, reference is made to the claims.

In the method of the invention, an equivalent circuit describing the properties of a permanent magnet. synchronous motor is formed. Via calculations based on the equivalent circuit, a vectorial representation. of the control quantities is produced, in which the horizontal axis of the co-ordinate system used represents the magnetisation, the vertical axis represents the torque and the vectors used are the stator voltage, the supply voltage and the current, which is at a distance of 90° from the horizontal axis. Therefore, the angle of the current may be +90° or −90°. In the vectorial representation, a correction vector is produced via inference preferably based on the equivalent circuit. The correction vector is summed with the electromotive force, and the result produced is the stator voltage or a voltage reference for the stator voltage required. The method makes it possible to advantageously reduce the amplification factor needed in the current feedback loop. For example, the amplification factor required without correction is 10 . . . 30, whereas the amplification factor needed after correction is 1 . . . 5. A lower amplification allows several advantages to be achieved; for instance, the system's sensitivity to interference is reduced.

In a preferred embodiment of the present invention, the motor voltage is calculated by means of an analogue calculator using an analogue electromotive force estimator and current feedback.

In a preferred embodiment of the present invention, each motor phase is controlled separately.

In a preferred embodiment of the present invention, the calculation of the correction vector is dependent on the torque required.

In a preferred embodiment of the present invention, the calculation of the correction vector is implemented using an operational amplifier circuit.

When a permanent magnet synchronous motor driving an elevator is controlled using the method and/or control loop of the invention, the speed of regulation allows a better controllability of elevator motion and an improved travelling comfort to be achieved. Especially processing the signals involved in the regulation in analogue form is a factor that permits fast feedback in the correction of any deviations.

Figure 2:
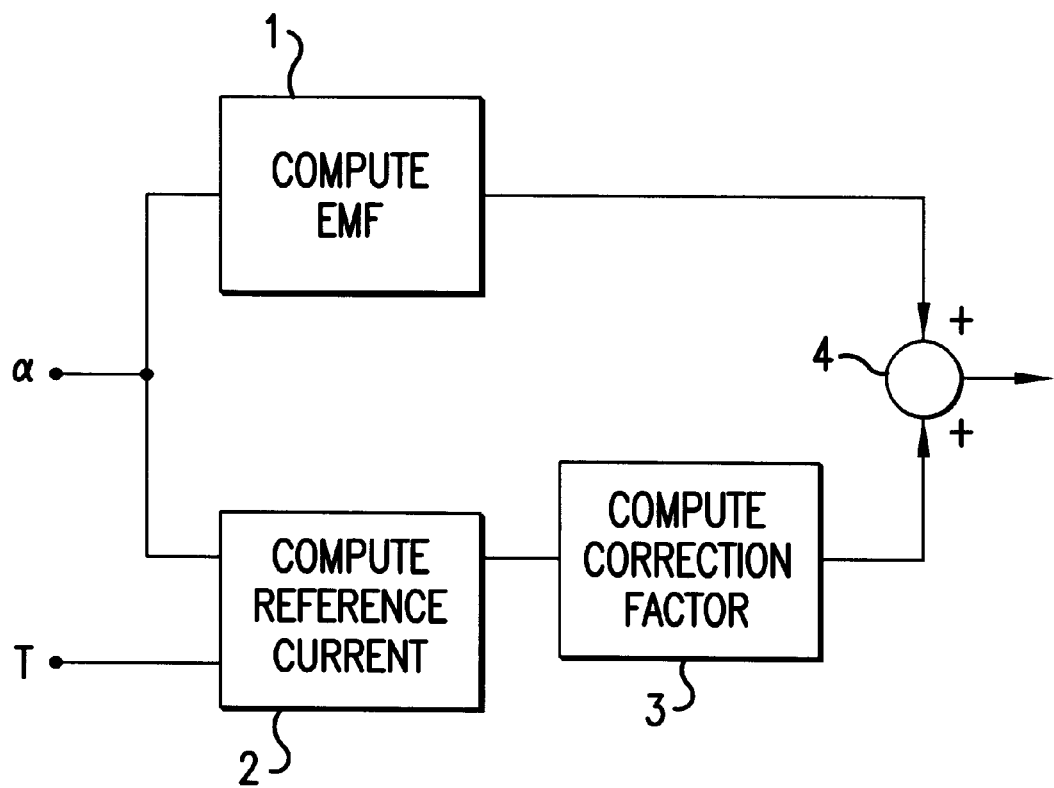
Figure 3:
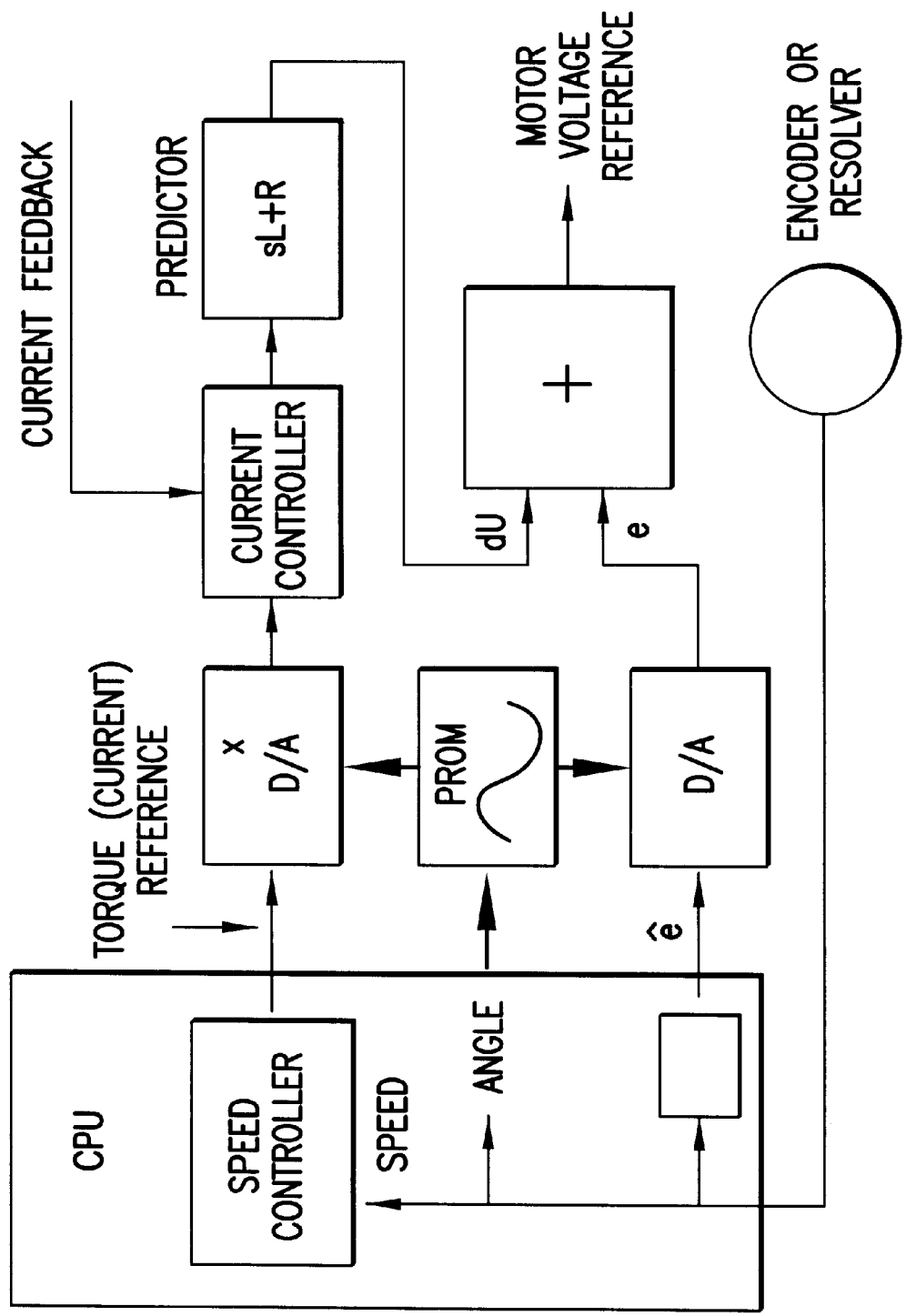
Figure 4:
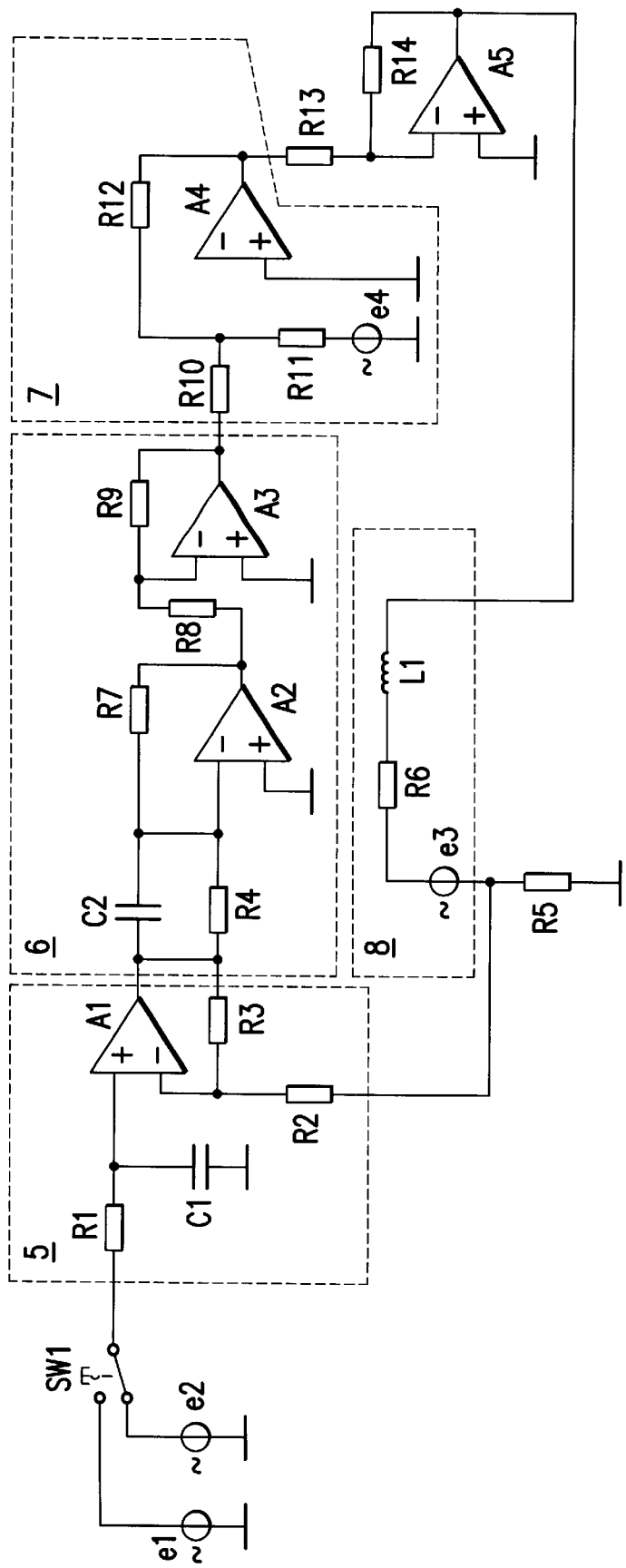

In the following, the invention will be described by the aid of a few examples of its embodiments by referring to the attached drawing, wherein FIG. 1 presents an equivalent circuit for a permanent magnet synchronous motor;

FIG. 2 presents an example representing an embodiment of the invention;

FIG. 3 presents a block diagram of a control loop implementing the invention; and, FIG. 4 presents an example of a circuit diagram for an embodiment.

FIG. 1 shows an equivalent circuit for a permanent magnet synchronous motor, where Us is stator voltage, Ls is motor inductance, Rs is stator resistance, e is motor supply voltage and I is current. An earlier application by the same applicant describes a method for determining the parameters for an electric drive controlling a permanent. magnet synchronous motor, which can be used to establish the values of the equivalent circuit.

FIG. 2 presents an embodiment of the invention as an example. The control unit receives from the motor a feedback signal representing the. rotor angle α and a torque requirement T calculated on the basis of speed data. The invention could also be implemented without angle data .feedback, but in this case the motor might show more oscillations at departure and the efficiency would be accordingly lower. Device 1 computes the motor's electromotive force as shown in the. equivalent circuit on the basis of the angle data α and the desired speed of rotation. In other words, in an ideal case, device 1 outputs the required motor input voltage in a situation where the motor has no load.

Device 2 computes the necessary current reference based on the torque requirement T. Device 2 receives the same angle data α as device 1, thus ensuring that the current is in phase with the input voltage during acceleration, or in exactly opposite phase during braking. Based on the current I, device 3 computes the correction vector to be added to the input voltage. The output of device 3 is the voltage vector dU, which is obtained in complex form from the equation $$dU = I(Rs + j\omega L)$$

The correction vector dU and the input voltage e are summed in a summing element 4, whose output gives the stator voltage or a stator voltage reference.

FIG. 3 shows a block diagram representing a control loop according to the invention, presented for one phase.

Using an encoder or a resolver, the required information for angle and/or speed feedback is obtained from the motor. In a processing unit, a speed reference is generated, and based on this, a torque reference is produced. A rotating electromotive force vector. e is generated using a table stored in PROM memory and a multiplying D/A converter. The PROM is common to the electromotive force reference and the current reference, ensuring phase coincidence or, when necessary, phase anticoincidence during braking. Using a predictor in conjunction with a current controller, changes in the condition of the motor can be anticipated, thus allowing a fast response in correcting the voltage reference, which is done by adding the correction dU to the vector e.

FIG. 4 presents a detailed circuit diagram of an embodiment described as an example. The figure presents as separate functional blocks a current reference generator S, a correction vector generator 6, a summing element. 7 and an ideal motor model 8. The block 5 generating the current reference corresponds in operation to device 2 in FIG. 2. Connected to the positive input of an operational amplifier is the torque reference, which is either positive e1 during acceleration or negative e2 during braking, supplied via a low-pass filter R1, C1. The correct torque reference is selected by means of a switch SW1. The negative input receives a voltage reference obtained from the motor model 8, as well as negative feedback. The operational amplifier A1 functions as a differential amplifier and its output is fed into the correction vector generator 6. The motor model is adapted to the parameters of capacitor C2 and resistors R4 and R7, and a differentiating circuit is formed by means of operational amplifier A2. The output of operational amplifier A3 gives the desired correction vector. The operational amplifier A4 in block 7 is used as an analogue summing circuit, which adds the correction vector and the motor supply voltage estimate together. Operational amplifier A5 serves as a power amplifier for the motor control voltage.

The invention is not restricted to the examples of its embodiments described above, but many variations are possible within the scope of the inventive idea defined by the claims.

What is claimed is:

1. Method for controlling a permanent magnet synchronous motor, wherein
    an equivalent circuit describing the properties of the permanent magnet synchronous motor is formed, and
    via calculations based on the equivalent circuit, a vectorial representation of the control quantities is produced, in which the horizontal axis of the coordinate system used represents the magnetisation, the vertical axis represents the torque and the vectors used are stator voltage (Us), supply voltage (e) and current (I), which is at a distance of 90° from the horizontal axis, wherein, in the vectorial representation, a correction vector (dU) is formed via inference based on the equivalent circuit and the correction vector is summed with the electromotive force, giving the stator voltage (Us) as a result.

2. Method as defined in claim 1, wherein the stator voltage is calculated by means of an analogue calculator using an analogue electromotive force estimator and current feedback.

3. Method as defined in claim 1, wherein each motor phase is controlled separately.

4. Method as defined in claim 1, wherein the calculation of the correction vector is dependent on the torque required.

5. Method as defined in claim 1, wherein the calculation of the correction vector is implemented using an operations amplifier circuit.

6. Control loop for generating a reference for a permanent magnet motor, wherein, in the control loop, using an encoder or a resolver, angle and/or speed information is obtained as a feedback signal from the motor, and a processing unit in the control loop contains means for generating a speed reference, a torque reference being produced on the basis of said speed reference, and the control loop comprises means for generating a rotating electromotive force vector e, said means comprising a table stored in PROM memory and a multiplying D/A converter, and that a predictor anticipating changes in the condition of the motor is provided in conjunction with a current controller to correct a voltage reference in the control loop by adding a correction dU produced by the predictor to the vector e.

7. A method of controlling a permanent magnet synchronous motor comprising the steps of:
    a) determining a voltage related to desired motor voltage in the absence of load based on the detected rotational angle of the motor using a model of the motor;
    b) determining the current to be supplied to the motor based on torque to be supplied to the motor at a desired speed;
    c) generating a correction vector to be added to the voltage determined said step a) based on the current determined in said step b); and
    d) adding the correction vector and motor voltage to produce a supply voltage for the motor.

8. The method according to claim 7, wherein said correction vector corrects phase alignment of the applied voltage to the detected phase of the motor current.

9. The method according to claim 8, further comprising:
    e) detecting the speed of the motor; and
    f) determining the torque to be supplied to the motor in said step b) of determining based on the speed detected in said step b).

10. The method according to claim 7, wherein said current to be supplied to the motor in step b) is also related to rotational angle of the motor.

11. The method according to claim 7, further comprising:
    e) detecting the rotational angle of the motor;
    said step a) determining the desired electromotive force to be supplied by the motor from the rotational angle using a lookup table.

12. The method according to claim 7, wherein said step c) of generating a correction vector uses a predictor to anticipate changes in motor current.

13. A motor control circuit comprising:
    a motor voltage determining circuit, the motor voltage determining circuit determining a voltage related to desired motor voltage based on detected motor phase angle;
    a current determining circuit determining the current to be supplied to the motor based on torque to be supplied to the motor at a desired speed;
    a vector correction circuit generating a correction vector to be added to the voltage determined said step a) based on the current determined in said step b); and
    an adder adding the correction vector and motor voltage to produce a supply voltage for the motor.

14. The circuit according to claim 13, wherein said correction vector corrects phase alignment of the applied voltage to the detected phase of the motor current.

15. The circuit according to claim 13, wherein said current determining circuit determines the current to be supplied to the motor based on the rotational angle of the motor.

16. The circuit according to claim 13, further comprising:
    a position/speed encoder detecting motor rotor position and/or speed; and
    said motor voltage determining circuit determining the torque to be supplied to the motor based on the output of said position/speed detector.

17. The circuit according to claim 13, further comprising:

a position encoder detecting the rotational angle of the motor;

said motor voltage determining circuit including a lookup table to determine the desired electromotive force to be supplied by the motor from the rotational angle.

18. The circuit according to claim 13, wherein said vector correction circuit includes a predictor to generate the correction vector to anticipate changes in motor current.

19. A method for controlling a permanent magnet synchronous motor comprising:

forming an equivalent circuit describing the properties of the permanent magnet synchronous motor;

producing a vectoral representation of the control quantities associated with the permanent magnet synchronous motor using calculations based on the equivalent circuit, wherein the horizontal axis of a coordinate system used in the vectoral representation represents a magnetization, a vertical axis represents a torque and wherein the vectoral representation further includes a stator voltage vector, a supply voltage vector, and a current vector; and forming a correction vector based on the vectoral representation and the equivalent circuit and summing the correction vector with an electoral motive force to produce a stator voltage.

20. A method according to claim 19, further comprising the step of calculating the stator voltage using an analog calculator, an analog electrical motor force estimator, and current feedback.

21. The method according to claim 19, further comprising the step of controlling each phase associated with the permanent magnetic synchronous motor separately.

22. The method according to claim 19, wherein the step of forming a correction vector further depends on a required torque value.

23. The method according to claim 19, wherein the step of forming the correction vector further includes forming the correction vector using an operational amplifier circuit.

24. A permanent magnet motor, and a controller coupled to the permanent magnet motor, the controller for generating a reference, the controller receiving one or more of angle information, torque information, and speed information, the controller configured to, generate a rotating electrical motor force vector;

predicting changes in conditions associated with the motor to produce a correction value;

correcting a voltage reference by adding the correction value to the electrical motor force vector;

the controller further comprising a D/A converter; and wherein the rotating electrical motor force vector is generated using a value stored in a memory.

* * * * *